US007236929B2

(12) United States Patent
Hodges

(10) Patent No.: US 7,236,929 B2
(45) Date of Patent: Jun. 26, 2007

(54) ECHO SUPPRESSION AND SPEECH DETECTION TECHNIQUES FOR TELEPHONY APPLICATIONS

(75) Inventor: Richard Hodges, Oakland, CA (US)

(73) Assignee: Plantronics, Inc., Santa Cruz, CA (US)

( * ) Notice: Subject to any disclaimer, the term of this patent is extended or adjusted under 35 U.S.C. 154(b) by 838 days.

(21) Appl. No.: 10/012,225

(22) Filed: Dec. 3, 2001

(65) Prior Publication Data

US 2002/0169602 A1 Nov. 14, 2002

Related U.S. Application Data

(60) Provisional application No. 60/289,948, filed on May 9, 2001.

(51) Int. Cl.
*G10L 15/20* (2006.01)
*G10L 21/00* (2006.01)

(52) U.S. Cl. ...................................... 704/233; 215/226

(58) Field of Classification Search ................ 704/233, 704/248, 246, 226
See application file for complete search history.

(56) References Cited

U.S. PATENT DOCUMENTS 4,704,730 A * 11/1987 Turner et al. ............... 704/210
5,263,019 A 11/1993 Chu
5,305,307 A 4/1994 Chu
5,365,583 A 11/1994 Huang et al.
5,459,814 A 10/1995 Gupta et al. ............... 395/2.42
5,524,148 A 6/1996 Allen et al.
5,550,924 A 8/1996 Helf et al.
5,668,794 A 9/1997 McCaslin et al. ........... 370/288
5,778,082 A 7/1998 Chu et al.
5,787,183 A 7/1998 Chu et al.
5,832,444 A 11/1998 Schmidt
5,893,056 A 4/1999 Saikaly et al. .............. 704/226
5,943,645 A 8/1999 Ho et al. ..................... 704/226
6,001,131 A 12/1999 Raman ....................... 703/226
6,097,824 A 8/2000 Lindemann et al.
6,130,943 A 10/2000 Hardy ........................ 379/406
6,212,273 B1 4/2001 Hemkumar et al.
6,282,176 B1 8/2001 Hemkumar
6,324,509 B1 * 11/2001 Bi et al. ..................... 704/248
6,347,081 B1 * 2/2002 Bruhn ........................ 370/337
6,351,731 B1 2/2002 Anderson et al.
6,381,570 B2 4/2002 Li et al.
6,415,029 B1 * 7/2002 Piket et al. ............ 379/406.04
6,434,246 B1 8/2002 Kates et al.
6,480,823 B1 * 11/2002 Zhao et al. ................. 704/226
6,574,601 B1 * 6/2003 Brown et al. ............ 704/270.1
6,618,701 B2 * 9/2003 Piket et al. ................. 704/233
6,721,411 B2 4/2004 O'Malley et al.
6,731,767 B1 5/2004 Blamey et al.
6,741,873 B1 * 5/2004 Doran et al. ............. 455/569.1
2001/0001141 A1 * 5/2001 Sih et al. .................... 704/231
2001/0023396 A1 * 9/2001 Gersho et al. .............. 704/220
2002/0010580 A1 * 1/2002 Li et al. ..................... 704/233
2002/0184015 A1 * 12/2002 Li et al. ..................... 704/233
2003/0105624 A1 * 6/2003 Yokoyama .................. 704/201

* cited by examiner

OTHER PUBLICATIONS

Lynch, J. Josenhans, J. Crochiere, R. "Speech/Silence segmentation for real-time coding via rule based adaptive endpoint detection", Acoustics, Speech and Signal Processing, vol. 12, pp. 1348-1357, Apr. 1987.*

*Primary Examiner*—David Hudspeth
*Assistant Examiner*—Matthew J. Sked
(74) *Attorney, Agent, or Firm*—Thomas Chuang

(57) ABSTRACT

Various methods and apparatus are described for implementing effective echo suppression in a wide variety of telephony system architectures. These methods and apparatus include broadband and multi-band techniques for speech detection, estimation of near-end transmission path attenuation, and estimation of far-end transmission path attenuation and delay.

4 Claims, 10 Drawing Sheets

ECHO SUPPRESSION AND SPEECH DETECTION TECHNIQUES FOR TELEPHONY APPLICATIONS

RELATED APPLICATION DATA

The present application claims priority from U.S. Provisional Patent Application No. 60/289,948 for ECHO SUPPRESSION AND SPEECH DETECTION TECHNIQUES FOR TELEPHONY APPLICATIONS filed on May 9, 2001, the entire disclosure of which is incorporated herein by reference for all purposes.

BACKGROUND OF THE INVENTION

The present invention relates to telephony and voice applications in digital networks, and specifically to techniques for mitigating the effects of echo in such applications. More specifically, the present invention relates to techniques for speech detection and echo suppression.

In telephony applications, acoustic coupling between the speaker and microphone at the far end can result in reception of an "echo" at the near end which is annoying to the near end user and makes it difficult to communicate coherently, thus significantly undermining the efficacy of such applications. In digital network telephony, this problem is exacerbated by the relatively long delays in the transmission paths, and the typically poor acoustic isolation of the transducers used by such applications.

There are two solutions to this problem, commonly referred to as echo cancellation and echo suppression, either of which may be used alone or in combination with the other. Echo cancellation is typically implemented as an adaptive filtering algorithm in the far-end equipment and can be highly effective. Basically, echo cancellation algorithms model the process by which the echo at the far end is generated, generate an estimated echo signal, and subtract the estimated echo signal from the signal to be transmitted to the near end.

However, there are some issues which limit the universal applicability of conventional echo cancellation techniques. For example, because changes in the acoustic attenuation of various echo paths cannot be compensated for immediately, some of the echo leaks through. In addition, in the presence of large amounts of acoustic noise, the adaptive algorithm may not converge. Also, large amounts of computational resources are required for such algorithms. Finally, in order for a near-end user to derive the benefit of echo cancellation algorithms in far-end telephony equipment, the equipment at both ends must be provided by the same or cooperative vendors, an obvious limitation on the effective deployment of such techniques.

By contrast, echo suppression, which may be used instead of or in conjunction with echo cancellation, is typically implemented as an algorithm running entirely in the near-end equipment. The fundamental idea is to detect when the near-end user is speaking and, allowing for the round-trip delay of the echo signal, to significantly reduce the gain of the near-end speaker, a technique often referred to as "ducking." Any echo that might otherwise be heard is reduced to the point where it does not interfere with the near-end user's current attempts at communicating.

Unfortunately, many currently available echo suppression techniques are relatively primitive. That is, such techniques typically detect when a near-end user is speaking and turn down the near-end speaker gain at some fixed delay from when the speech is detected. The fixed delay is typically relatively short, e.g., 200 ms, to ensure that the suppression of the near-end speaker occurs before any echo is received. In addition, the suppression typically continues well after the detected speech has ended to ensure that all of the corresponding echo has been suppressed.

The problem with such a brute force approach to echo suppression is that much more information is suppressed than is necessary, including speech from the far-end user which occurs simultaneously with the near-end speech, i.e., the so-called double talk condition. It is therefore desirable to provide echo suppression techniques that more intelligently suppress echo as well as avoid the undesirable suppression of far-end speech.

SUMMARY OF THE INVENTION

According to the present invention, techniques are provided for echo suppression and speech detection which estimate the actual round trip delay in a connection between a near-end and a far-end and make intelligent decisions about when to engage in echo suppression. According to a specific embodiment, relating to detection of speech in a telephony system. An energy level associated with a received signal is measured. The energy level is compared with a current background noise estimate. The current noise estimate is updated to be equal to the energy level where the energy level is less than the current noise estimate. The current noise estimate is increased using an upward bias where the energy level is greater than the current noise estimate. Speech energy is detected with reference to a threshold, the threshold being determined with reference to the current noise estimate.

According to another specific embodiment relating to detection of speech in a telephony system, a hysteresis value is set with reference to whether speech is determined to be occurring. Speech is detected with reference to a threshold value and the hysteresis value.

According to another embodiment relating to detection of speech in a telephony system, a burst of speech energy having a leading edge and a trailing edge is detected. A period of time is identified during which speech is determined to be occurring, the period of time beginning a first predetermined amount of time before the leading edge of the burst of speech energy and ending a second predetermined amount of time after the trailing edge of the burst of speech energy.

According to yet another embodiment relating to detection of speech in a telephony system, an energy level associated with a received signal is measured for each of a plurality of frequency bands. The energy level for each of the plurality of frequency bands is compared to a threshold level. Speech is determined to be occurring where the energy level exceeds the threshold level for at least one of the plurality of frequency bands.

According to a specific embodiment relating to estimation of an attenuation level associated with a transmission path in a telephony system, first energy measurements associated with a source signal are compared with second energy measurements associated with a received signal to identify second energy bursts in the received signal which correspond to first energy bursts in the source signal. According to this embodiment, the first and second energy measurements comprise logarithm values.

According to another embodiment relating to estimation of an attenuation level associated with a transmission path in a telephony system, first energy associated with a source signal and second energy associated with a received signal are measured. A delay associated with the source and received signals is compensated for using each of a plurality of delay values in a range. An attenuation value is estimated for each of the plurality of delay values. The attenuation level is selected from the attenuation values associated with the range of delay values.

According to another specific embodiment relating to estimation of an attenuation level associated with a transmission path in a telephony system, first energy associated with a source signal and second energy associated with a received signal are measured. A delay associated with the source and received signals is compensated for. Measured values of the first and second energy are processed to generate pattern matching data. A cluster analysis is performed with the pattern matching data to estimate the attenuation level. According to a more specific embodiment, the cluster analysis is a median analysis.

According to an alternate embodiment, a difference value is generated for each of a plurality of pairs of the measured values of the first and second energy, each of the plurality of pairs comprising a first one of the measured values of the first energy and a temporally corresponding one of the measured values of the second energy. A probabilistic curve is generated for each of the difference values. The probabilistic curves are combined and a peak associated with the combined curve is identified as corresponding to the attenuation level.

According to a more specific embodiment, selected ones of the probabilistic curves are weighted according to at least one criterion. According to one such embodiment, the at least one criterion relates to how at least one of the pair of measured values for each of the selected probabilistic curves relates to a corresponding noise value. According to another such embodiment, the at least one criterion relates to a rate of change of at least one of the first energy and the second energy during a time period corresponding to the selected probabilistic curves.

According to a further embodiment relating to estimation of an attenuation level associated with a transmission path in a telephony system, first energy associated with a source signal and second energy associated with a received signal are measured for each of a plurality of frequency bands. A delay associated with the source and received signals is compensated for. An attenuation value is estimated for each of the plurality of frequency bands. The attenuation level is determined with reference to at least some of the attenuation values. According to a more specific embodiment, selected ones of the attenuation values are weighted according to at least one criterion. According to an even more specific embodiment, the at least one criterion relates to a measure of perceptual relevance associated with each of the plurality of frequency bands.

A further understanding of the nature and advantages of the present invention may be realized by reference to the remaining portions of the specification and the drawings.

DETAILED DESCRIPTION OF SPECIFIC EMBODIMENTS

Figure 1:
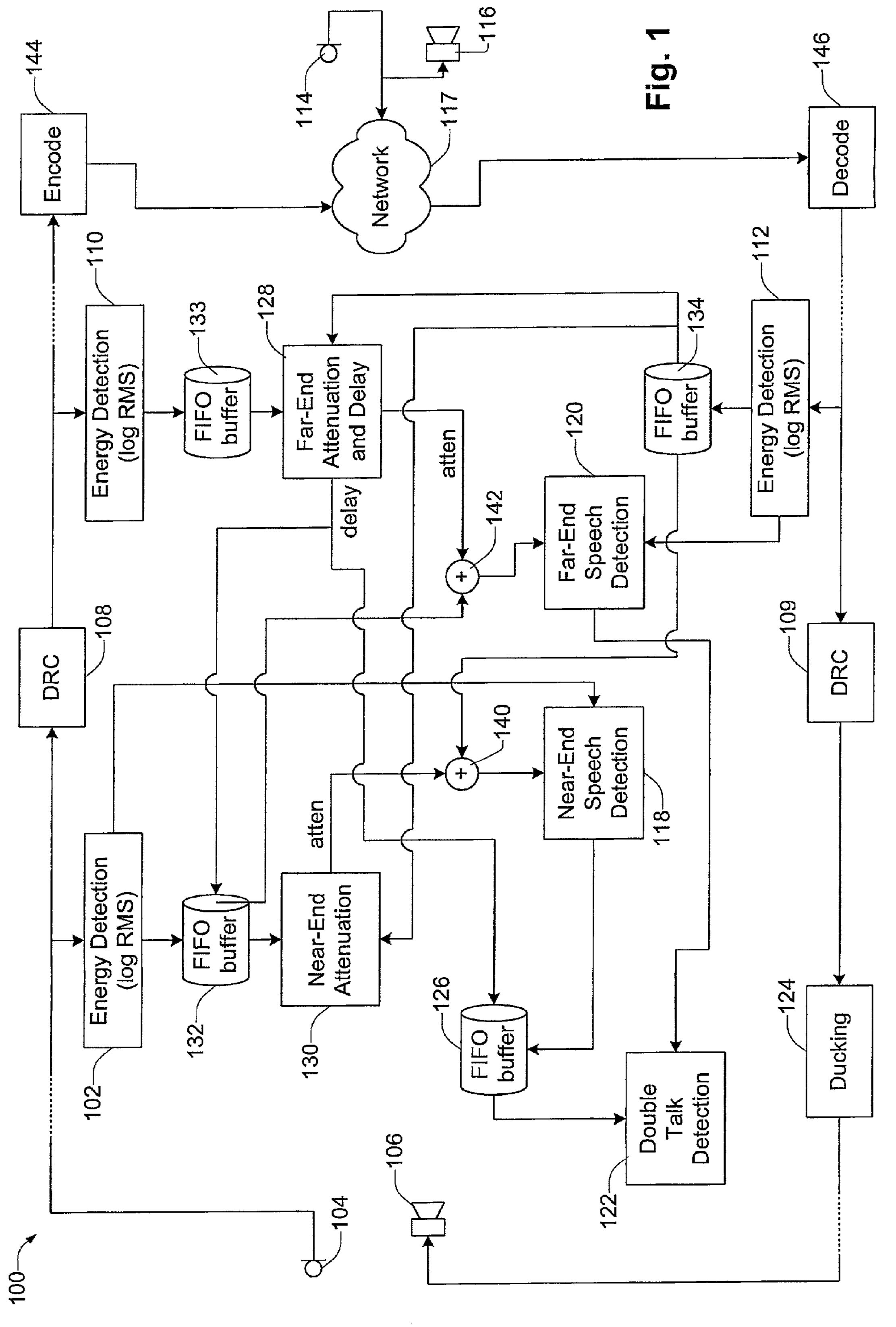
FIG. 1 is a block diagram of a telephony application in a digital network according to a specific embodiment of the present invention.

FIG. 1 shows a telephony system 100 in which specific embodiments of the present invention are practiced. Specific embodiments of several of the blocks of system 100 will be described with reference to subsequent figures. An embodiment of an echo suppression algorithm designed according to the invention will then be described. As will be understood, each of the embodiments described may be implemented in any of a wide variety of computing devices using any of a wide variety of programming languages and communication protocols. For example, the near-end processing blocks of telephony system 100 may be implemented in a single personal computer or workstation or a general-purpose server. Alternatively, these processing blocks may be implemented in a distributed computing environment in which various ones of the blocks are implemented in different network nodes. Embodiments are also envisioned in which at least some of the signal processing is accomplished in hardware with the use of, for example, programmable logic devices, FPGAs, or ASICs. Given the vast number of implementations possible for the described system and the various components thereof, the present invention is not limited to any one implementation. Rather, the present invention encompasses any combination of software and hardware resources in which the techniques described herein may be implemented.

Referring now to FIG. 1, there are three separate energy detection blocks for detecting the energy of their respective speech signal inputs. Each of the energy detection blocks breaks up the speech samples into windows of, for example, 10 ms. Energy detection block 102 is for measuring the energy of the speech directly from microphone 104 (or after any optional echo cancellation has been performed) and before any dynamic range compression (DRC 108) occurs. Energy detection block 110 is for measuring the energy of the speech after the dynamic range compression of DRC 108 (which changes the energy profile of the speech signal) and before the signal is encoded (block 144) for transmission over network 117. Energy detection block 112 is for measuring the energy of the signal received from the far-end equipment (i.e., microphone 114 and speaker 116) via network 117 after decoding (block 146) and before any additional (and optional) dynamic range compression (DRC block 109).

It will be understood that network 117 may represent any of a wide variety of computer and telecommunications networks including, for example, a local area network (LAN), a wide area network (WAN) such as the Internet or World Wide Web, phone company infrastructure, wireless or satellite networks, etc. It will also be understood that the codec represented by blocks 144 and 146 may be any of a wide variety of codecs including, for example, GSM, G.711, G.723, G.729, CELP, and VCELP. In addition, as indicated by the dashed lines on either side of the DRC blocks, additional processing blocks may be included without departing from the scope of the invention.

According to a specific embodiment, the energy detection blocks measure the energy of their respective speech signals by performing an RMS calculation with the samples in the window (i.e., adding up the sum of the square of the samples in the window) and taking the log of the result, ending up with in an energy measurement in units of dB. It turns out that this gives these energy measurements some mathematical characteristics which facilitate the speech detection and echo suppression algorithms described below. That is, the source and received energy signals more closely resemble each other in the log domain than the linear domain thereby facilitating the pattern matching algorithms employed by the various techniques described herein.

According to various embodiments, the energy measurements by the energy detection blocks may be broadband or multi-band measurements. For the multi-band implementations, the energy of the speech samples may be divided into the different bands using, for example, Fast Fourier Transforms (FFTs) or band-splitting filters. The number and the widths of the bands may be identical or may vary from one block to the next depending upon the how the energy information is used or according to the effect desired by the designer or user. In any case, the potential advantages of such multi-band implementations, and the uses to which the energy measurements from the energy detection blocks are put will be described in detail below.

Each energy detection block has an associated FIFO buffer (i.e., buffers 132, 133, and 134) which stores a history of the block's energy measurements for reasons which will become clear. The energy measurements are the main inputs for the near-end and far-end speech detection algorithms.

Figure 2A:
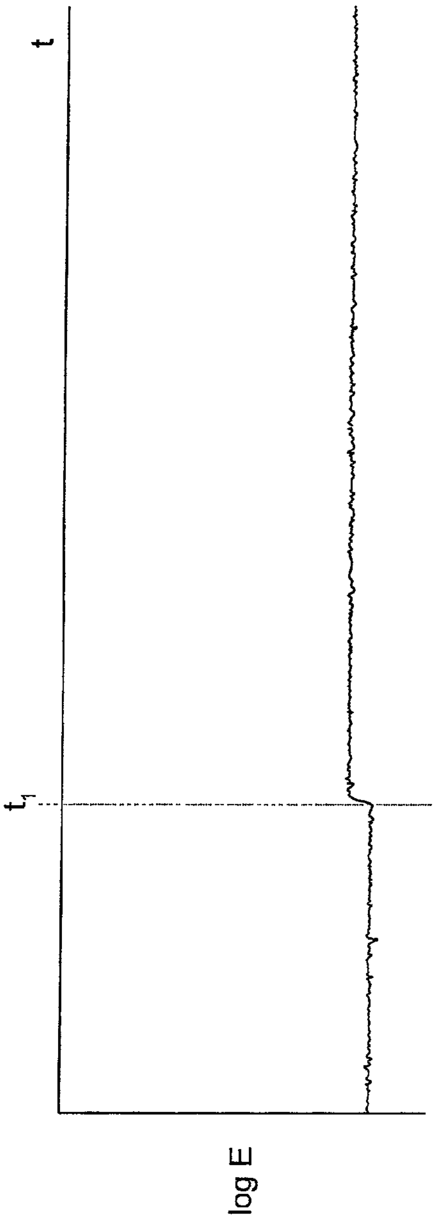
FIG. 2*a* is a graph of signal energy in an exemplary speech system in which speech is not occurring.
Figure 2B:
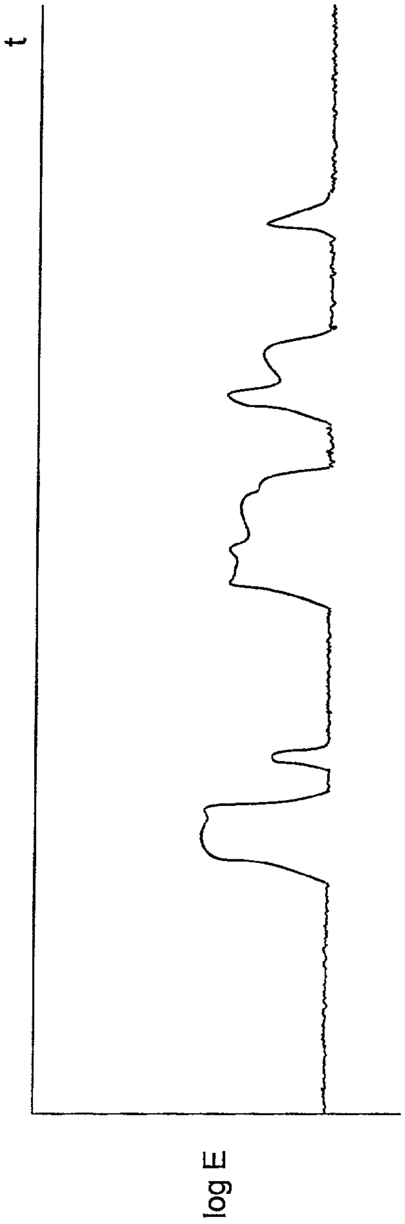
FIG. 2*b* is a graph of signal energy in an exemplary speech system in which speech is occurring.

The energy characteristics of the signal inputs to the energy detection blocks can be represented as shown in FIG. 2*a* in which speech is not occurring, and FIG. 2*b* in which speech is occurring. FIG. 2*a* shows the noise floor which is relatively constant over time, but which may jump (e.g., at time $t_1$) due to, for example, an increase in the background noise in the environment in which the speech signal was generated. Such an increase might result, for example, from the opening of a window or the operation of an air conditioning system. When speech is occurring, the detected energy of the speech signal is superimposed on the noise floor as represented by the bursts of FIG. 2*b* which roughly correspond to syllables.

In determining when speech is occurring, the speech energy signal is typically compared to a threshold energy level. If the signal level exceeds the threshold, it is determined that speech is occurring. It will be understood that it is important to set the threshold as low as possible so that the detected speech periods accurately reflect when speech is actually occurring. However, in view of the fact that the level of the noise floor is unknown and can fluctuate considerably, it is also important that the energy threshold not be set so low that the speech is falsely detected when background noise increases.

Thus, according to a specific embodiment of the present invention, a speech detection energy threshold is employed which adapts to changing noise conditions. According to a more specific embodiment, the adaptation occurs quickly enough to reduce the likelihood of false speech detection events, but slowly enough to avoid mistaking spread-out speech energy (e.g., associated with long duration, e.g., vowel, sounds) for an increase in ambient noise.

Figure 3:
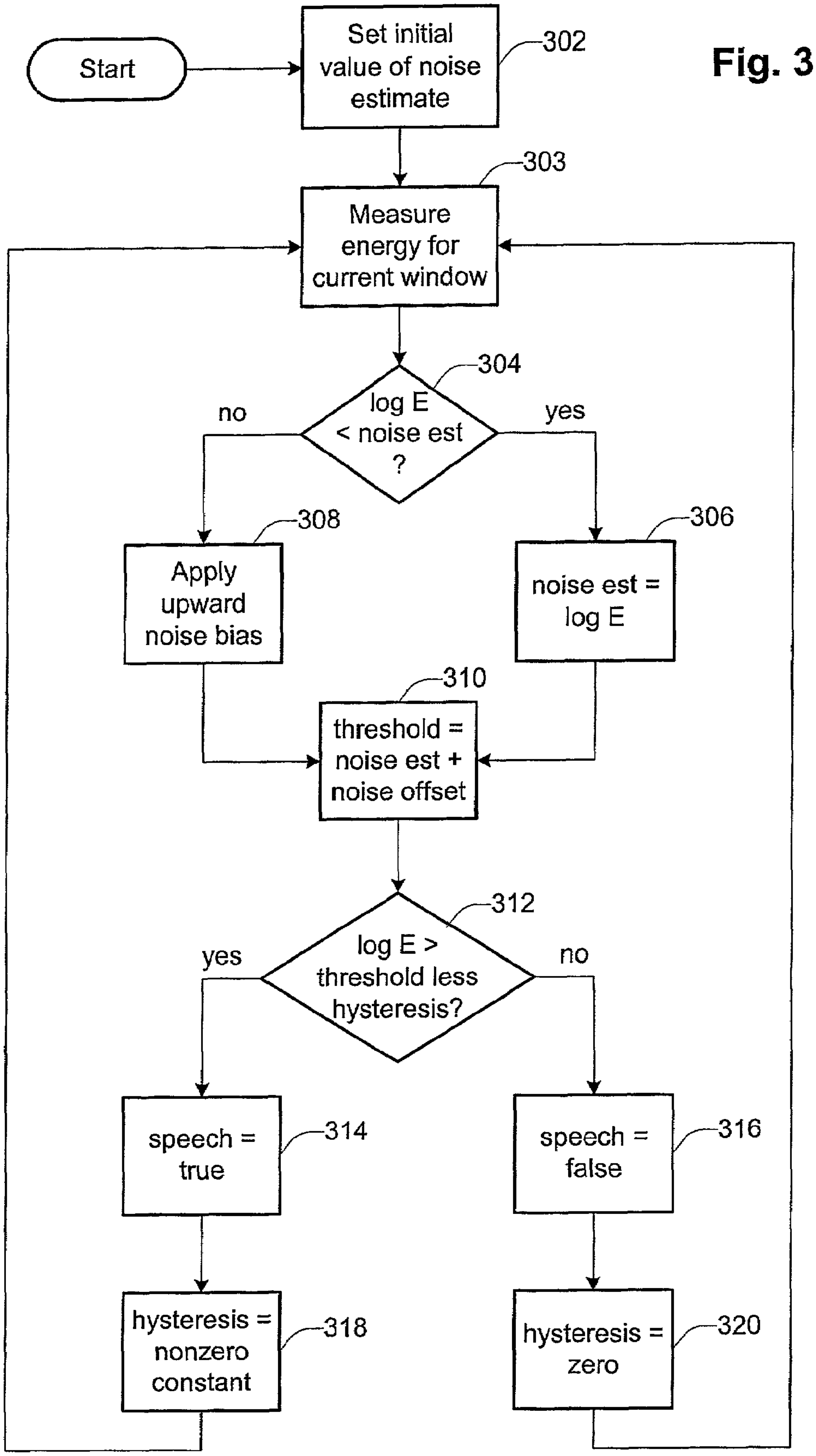
FIG. 3 is a flowchart illustrating a speech detection algorithm according to a specific embodiment of the present invention.

A specific embodiment of a speech detection algorithm for use with a telephony system designed according to the present invention will now be described with reference to flowchart 300 of FIG. 3. It should be noted that variations of the described algorithm may be employed for both near-end speech detection 118 and far-end speech detection 120 in the telephony system of FIG. 1.

When the system is brought on line, an initial value of the noise estimate is set (302). The energy of a window of samples is then measured (303) by, for example, energy detection block 102 or 112 of FIG. 1. If the current energy measurement for the current window of samples is less than the current value of the noise estimate (304), then the noise estimate is updated to the current energy measurement. Otherwise, the noise estimate is allowed to drift upward at a specific rate, e.g., 0.05 dB/sec, referred to herein as the upward noise bias (308). According to a specific embodiment and as described above, it is desirable that the upward noise bias be large enough to adapt to rising noise conditions without being so large that spurious signals, e.g., the speech itself, affect the adaptation rate too dramatically. For example, given that speech rarely has continuous bursts of energy that are longer than 1–2 seconds, an upward noise bias which takes on the order of 5 seconds to adapt might be a good compromise.

The energy threshold above which speech is considered to be occurring is then set to a value which is the sum of the current noise estimate and a noise offset constant, e.g., 3 dB, which reduces the likelihood that ambient noise will be detected as speech (310). The detected signal energy is then compared to the threshold to determine if speech is occurring. According to a specific embodiment, a hysteresis is introduced to avoid the condition under which the "speech=true" condition toggles rapidly back and forth over the threshold. If the measured signal energy is greater than the threshold minus the hysteresis (312), then speech is considered to be occurring and speech is set to true (314). Otherwise, speech is set to false (316).

The value of the hysteresis is then set for the next pass through the loop. According to a specific embodiment, if speech is currently determined to be occurring, i.e., speech=true, the hysteresis value is set to a nonzero constant (318). If, on the other hand, if speech is currently determined not to be occurring, i.e., speech=false, the hysteresis value is set to zero (320). Thus, where speech has already been detected, the energy threshold is lowered so that it is more difficult to go back to the non-speech condition. However by contrast, where speech has not yet been detected, the energy threshold is not lowered. The algorithm is then repeated for the next window of samples.

According to a specific embodiment, the periods of time for which the speech condition is determined to be true are extended both backward and forward in time, i.e., the leading edge is moved earlier and the trailing edge is moved later, to capture low energy but important speech components at these edges. That is, most of the speech energy detected for a given syllable corresponds to the more sustained portions of speech such as vowel sounds, while linguistically important components such as initial "Fs" and "Ss" or final "Ts" make up a relatively small portion of the energy. By extending the leading and trailing edges of the detected speech, there is a greater likelihood that these important speech components are "detected."

Extension of the trailing edge of detected speech is fairly easy to accomplish. That is, switching from the speech=true condition to the speech=false condition can simply be delayed for a certain period of time following the point at which the detected speech energy falls below the current threshold (as modified by any hysteresis). However, as will be understood, this same logic cannot be applied to the leading edge of the detected speech to move it back in time. Therefore, according to a specific embodiment, the signal chain through the speech detection algorithm is delayed slightly so that the leading edge of the detected speech can be effectively moved "back" in time. One embodiment actually takes advantage of a natural delay in the system due to the buffering of data as it is being processed in blocks, employing this delay (or at least part of it) to create the effect of moving the leading edge of detected speech to an earlier point in time.

According to various embodiments, the speech detection algorithm of the present invention may have broadband and multi-band implementations. In the case of a multi-band implementation, the signal energy would be divided into multiple bands as described above with reference to energy detection blocks 102, 110, and 112, and the speech detection algorithm described above with reference to FIG. 3 would be applied in parallel to each frequency band. Such an approach could be advantageous in that, as mentioned above, different frequency speech components may have different levels of energy which are significant. With the multi-band approach, this can be accounted for by having different detection thresholds for different bands. That is, as will be discussed below, a multi-band speech detection algorithm designed according to the invention may be "tuned" to the unique properties of speech to effect a more precise and reliable mechanism for determining when speech is occurring.

For example, using such an approach, the final decision as to whether speech is occurring can be made with reference to the results for any number of bands. For example, the speech condition can be set to true where speech is detected in any one band. Alternatively, the speech condition can be set to true where speech is detected in more than some number of the bands, e.g., more than 3 bands. In addition, an estimation of the probability that speech is actually occurring can be linked to detection of speech in specific bands. That is, for example, a higher confidence level might be assigned to detection of speech in a high frequency band vs. a lower frequency band, and weighting assigned accordingly.

In addition, with multi-band implementations, the upward noise bias, i.e., the rate at which the noise estimate adapts to apparent changes in ambient noise conditions, can be different for different frequency bands. This might be desirable, for example, for high frequency speech components (e.g., those exhibiting sibilant energy such as "Ss" and "Fs") in which the energy bursts are shorter and a faster noise floor adaptation rate could be tolerated.

According to specific embodiments, the relative widths of the bands in multi-band embodiments can be made to correlate with the so called "critical bands" of speech so that the bands are treated in accordance with their perceptual relevance. Thus, for example, the bands at the lower end of the spectrum could be narrower with the width increasing toward the higher frequency bands. This is reflective of the fact that there is a relatively narrow band, i.e., between 100 Hz and 800 Hz, where more most of the information relating to the intelligibility of vowels and consonants lies. Thus, having a relatively larger number of narrower bands in this region could improve the reliability of the speech detection. By contrast, although the information in the higher bands must be accounted for to have natural sounding speech, it could be effectively detected using relatively fewer and wider bands.

Referring again to FIG. 1, the results of the near-end and far-end speech detection algorithms 118 and 120 are fed to a double talk detection algorithm 122 to determine whether echo suppression, i.e., "ducking," (block 124) should occur. The results of the near-end speech detection algorithm are first put through a FIFO buffer 126 to insert a delay which is controlled by the far-end attenuation and delay algorithm 128 (the operation of which is described below). This is because any ducking should not occur until after the near-end speech has had a chance to make the round trip from the near-end microphone to the far-end equipment and back, the duration of which is estimated by block 128.

According to various embodiments, the determination as to whether ducking should occur can be relatively straightforward or complex. For example, according to one relatively simple embodiment, ducking occurs only where near-end speech is detected and there is no far-end speech detected. By contrast, the determination can be made based on the confidence level associated with the speech detection results. That is, as described above, in a multi-band implementation of the speech detection algorithm of the present invention, it can be possible to determine a level of confidence for a speech detection event based, for example, on the specific bands for which speech is detected. This confidence level could then be used to determine whether to invoke the ducking algorithm. So, for example, the rule could be that ducking should not be invoked unless there is a more than 50% certainty that near-end speech has been detected.

Figure 4:
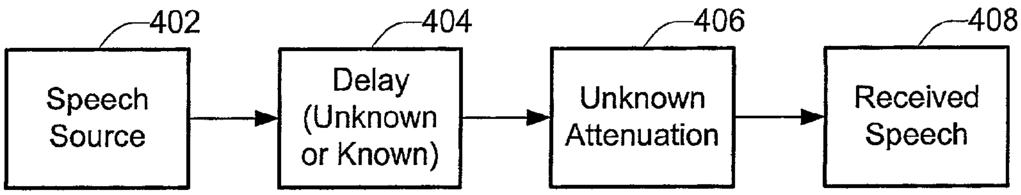
FIG. 4 is a simplified model of a generalized transmission path in a telephony system.

Techniques by which attenuation and delay in a telephony system are estimated for use with the echo suppression and speech detection techniques of the present invention will now be described. FIG. 4 is a simple model of the transmission path in a telephony system. The signal of interest is generated at a speech source 402 (e.g., microphone 114 of FIG. 1) and travels along a transmission path having a known or unknown delay 404 and an unknown attenuation 406 to a receiver 408. In estimating attenuation and delay, there are two transmission path cases (examples of which are shown in FIGS. 5*a* and 5*b*) which must be considered.

Figure 5A:
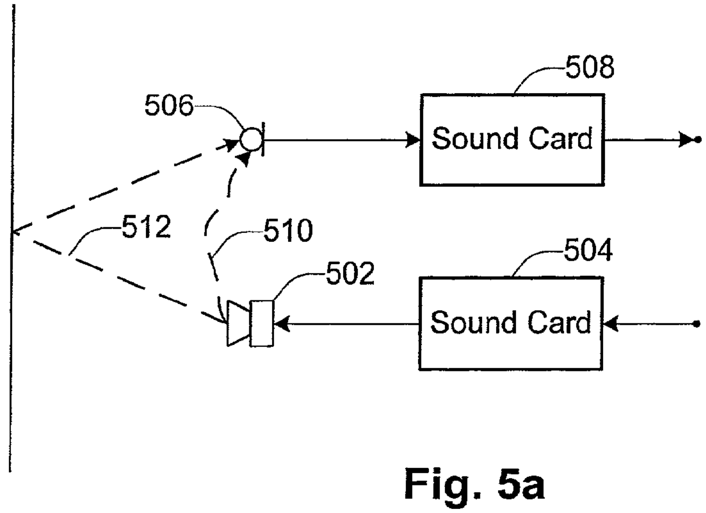
FIG. 5*a* is a simplified model of a near-end transmission path in a telephony system.

For the transmission path associated with the exemplary near-end equipment of FIG. 5*a*, the source of the speech is loudspeaker 502 and its associated sound card 504 which is received by microphone 506 and its associated sound card 508. The sound cards need to be included in the model because each has a measurable delay associated therewith. There is some variable amount of acoustic coupling between loudspeaker 502 and microphone 506, some direct (510), and some indirect (512) resulting from, for example, reflections off walls, which represents at least a portion of the attenuation in the transmission path. In addition, microphone 506 and loudspeaker 502 may have associated volume controls which change according to the user's preferences and represent further components of the attenuation. The delay associated with the near end equipment is essentially the delays associated with sound cards 504 and 508.

Figure 5B:
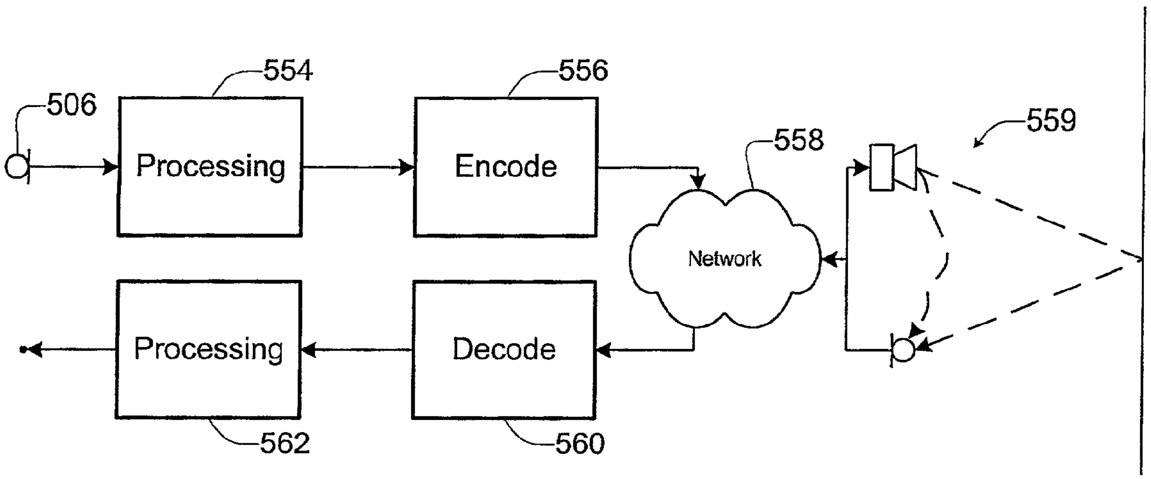
FIG. 5*b* is a simplified model of a far-end transmission path in a telephony system.

For the transmission path associated with the exemplary far-end equipment of FIG. 5*b*, a speech signal is generated at microphone 506, undergoes some processing 554 and encoding 556 before being transmitted over network 558 to far-end equipment 559. Due to similar acoustic coupling effects discussed above, speech energy originating at microphone 506 gets transmitted back through network 558, undergoes decoding 560 and some additional processing 562. All of the components in this transmission path contribute to its associated delay with network 558 typically being the largest component. Similarly, each of the components contributes to the attenuation associated with this transmission path. As mentioned above with reference to network 117 of FIG. 1, network 558 may comprise any of a wide variety of network types and topologies.

Figure 6:
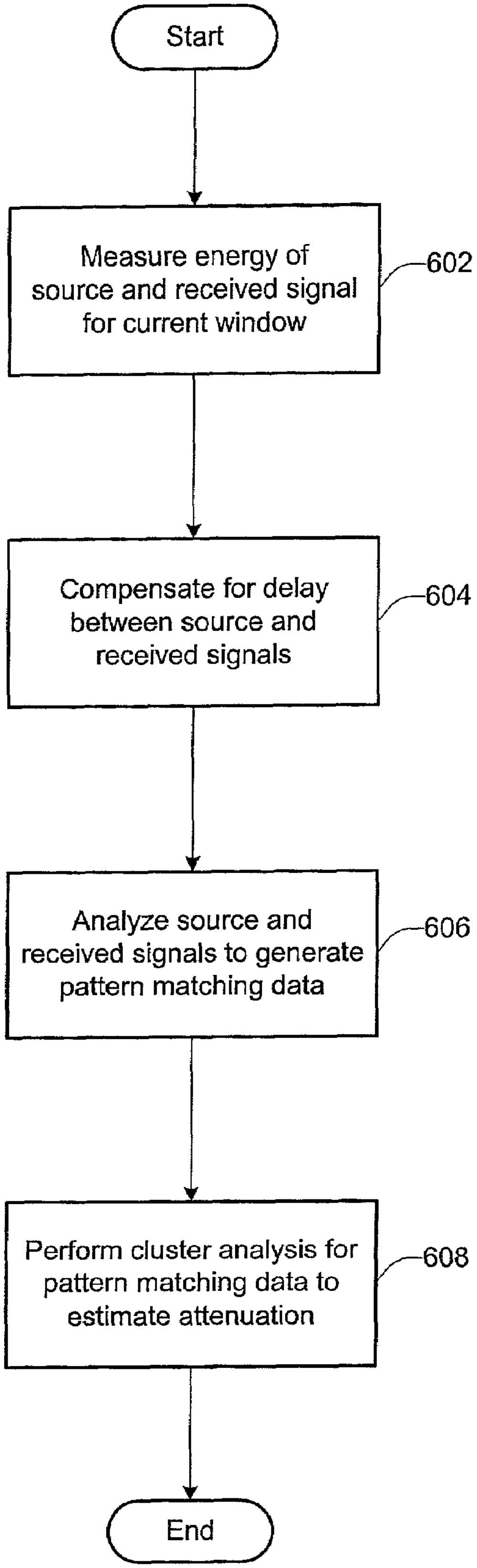
FIG. 6 is a flowchart illustrating a near-end transmission path attenuation estimation algorithm according to a specific embodiment of the invention.

According to a specific embodiment of the invention, the attenuation associated with the near-end transmission path in a telephony system (e.g., system 100 of FIG. 1) is estimated according to the exemplary process illustrated in the flowchart of FIG. 6. The delay for the near-end path is known because it is simply the combination of the delays of the near end components which, in the example of FIG. 5*a*, is the combination of the delays associated the two sound cards 504 and 508. It should be noted that the process illustrated in and described with reference to FIG. 6 may be used, for example, to implement near end attenuation block 130 of FIG. 1. It should also be noted that, and as will become clear, a variation of the algorithm illustrated in FIG. 6 may also be used to estimate the attenuation and delay associated with the far-end transmission path, e.g., far-end attenuation and delay block 128 of FIG. 1.

According to another specific embodiment, the near-end attenuation and delay can be measured by mixing into the sound data going to the speaker a pulse comprising a known waveform such as, for example, a sine wave tone or a combination of multiple tones. This known waveform can then be detected in the sound data recorded by the microphone, and its amplitude compared to the amplitude of the output waveform to determine the attenuation. If desired, the delay from output to input, including the delay due to the sound card, can be determined by computing the time at which the microphone sound data have the best match to the known waveform which was mixed with the outgoing sound data.

Figure 7A:
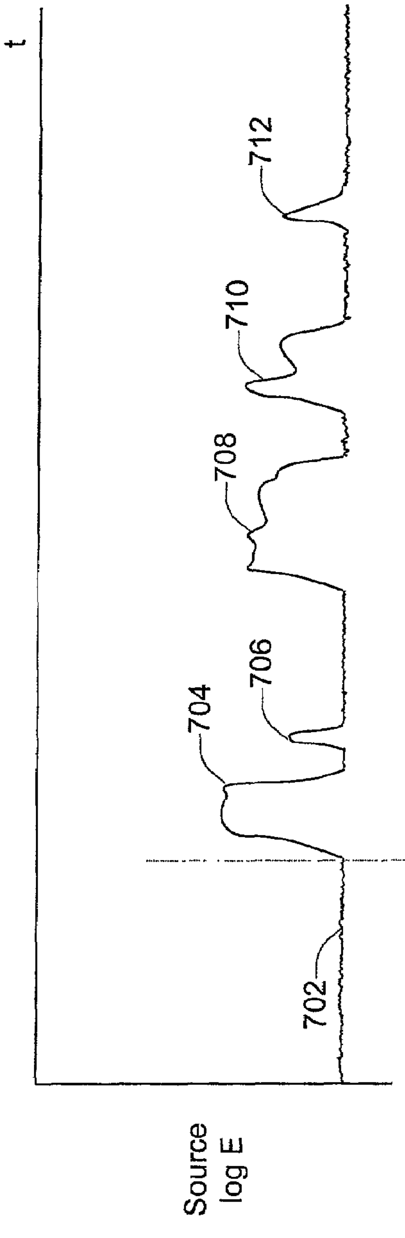
FIGS. 7*a* and 7*b* are graphic representations of the measured energy for the source and received signals in a telephony system.
Figure 7B:
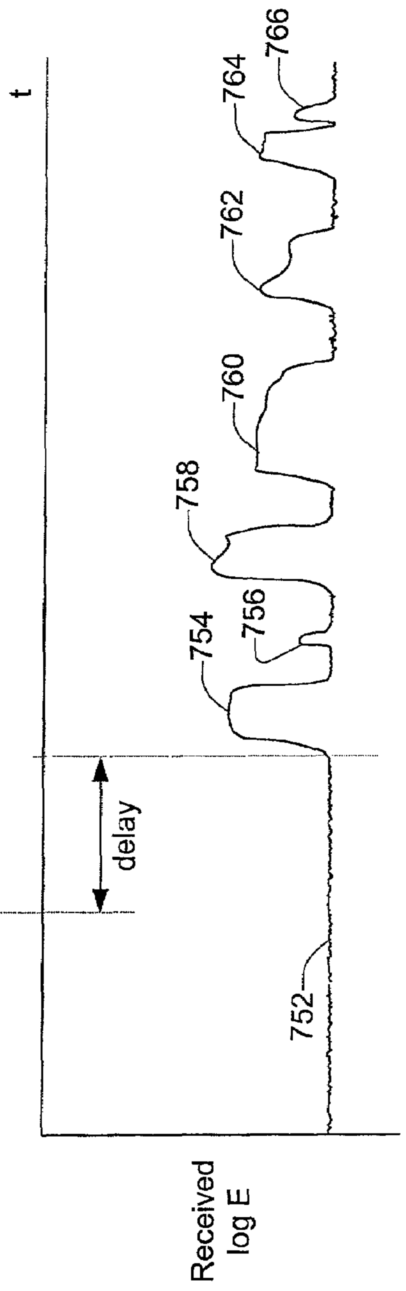

The energy of the near-end source signal and the near-end received signal is measured for successive windows of samples, i.e., the attenuation estimation window (602). In telephony system 100 of FIG. 1, this would be done by energy detection blocks 112 and 102, respectively, as described above. Graphic representations of the energy of these signals are shown in FIGS. 7*a* and 7*b*, respectively. As shown in FIG. 7*a*, the source signal is characterized by a noise floor 702 and syllabic bursts of energy 704–712.

As shown in FIG. 7*b*, the received signal is characterized by its own noise floor 752 (typically at a different level than noise floor 702) and syllabic bursts of energy some of which are images of the syllabic bursts of FIG. 7*a* (i.e., 754, 756, 760, 762 and 766) which are delayed in time (e.g., by the sound cards), and attenuated in both an absolute sense (i.e., absolute amplitude) as well as a relative sense (i.e., different level of prominence with respect to the noise floor). The received signal also includes bursts of energy (i.e., 758 and 764) corresponding to sound energy, e.g., speech, generated at the far-end equipment which naturally don't match any of the bursts of FIG. 7*a*. The attenuation of the signal from the source to the receiver may then be determined by comparison of the corresponding bursts of energy in the source and received signals.

Referring again to FIG. 6, using the known delay associated with the near-end transmission path, the delay between the energy signals corresponding to the source and the receiver (e.g., FIGS. 7*a* and 7*b*) is removed (604). For example, referring to FIG. 1, the known delay can be subtracted from the samples output from energy detection block 112 in FIFO 134 to effectively move the samples back in time to where they are at least roughly lined up with the corresponding samples from energy detection block 102.

The energy samples from both the source signal and the received signal are then processed to generate pattern matching data (606). According to a specific embodiment, these data may be represented by the scatter graph of FIG. 8 in which the received energy is plotted against the source energy for each sample window. That is, each point in scatter graph 800 represents the energy of the received signal and the energy of the source signal at a particular point in time.

There are a number of points in scatter graph 800 where neither signal is above its baseline noise. These are represented by the points 802 which cluster around the noise floor energies of both signals. There are also a number of points 804 at which the source energy and the received energy are following each other at an offset which fall along a straight diagonal line. There may also be points at which there is detectable source energy but no detectable received energy because the attenuation is sufficient to put any such energy below the received signal noise floor. These points correspond to points 806. Finally, there are points at which there is detectable received energy but either no detectable source energy or source energy which is unrelated (points 808 above diagonal line 804). This may be due, for example, to received energy which corresponds to acoustic energy at the far-end.

Figure 8:
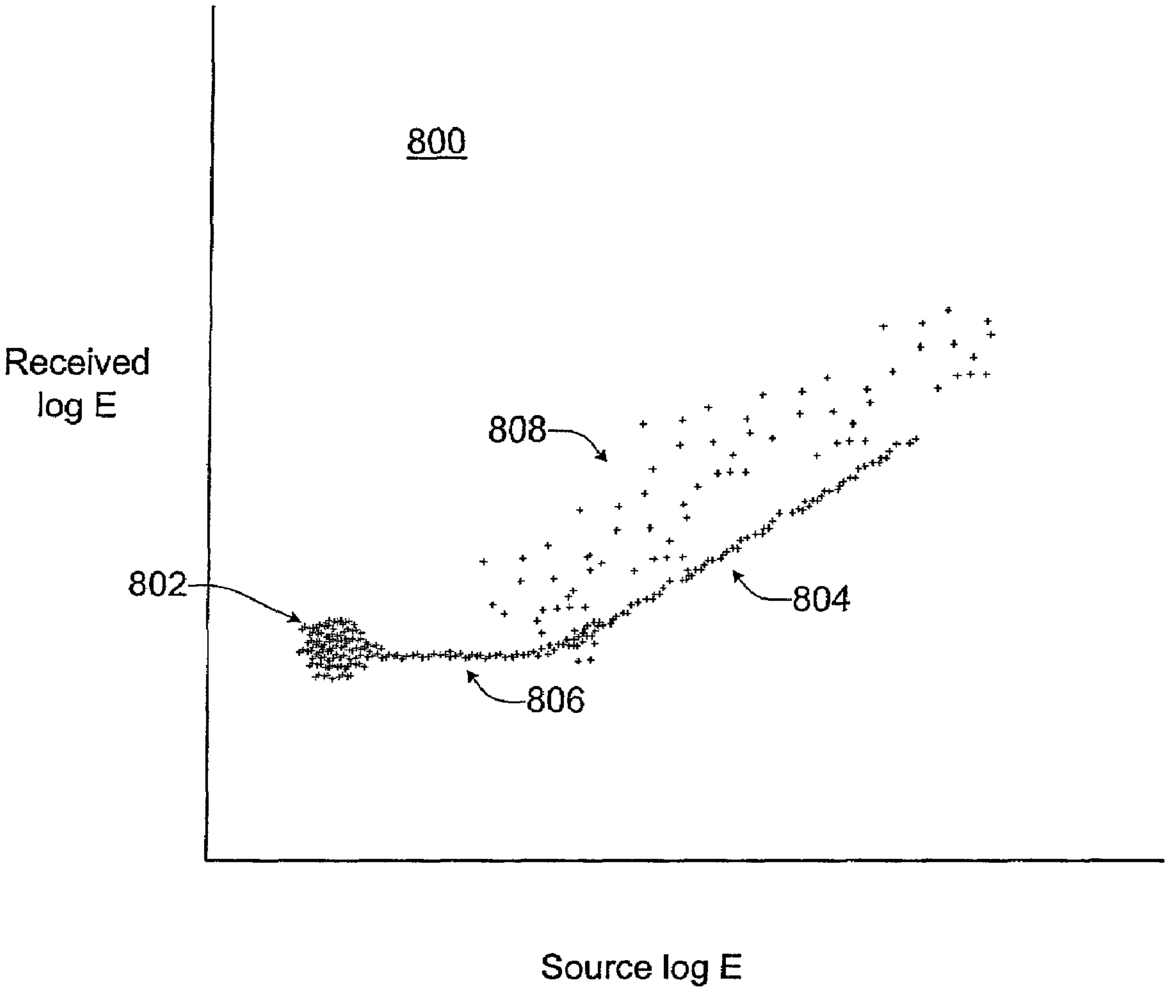
FIG. 8 is a scatter graph illustrating an exemplary pattern matching data point distribution.

A cluster analysis is then performed on the results of 606 to estimate the attenuation in the transmission path (608). Referring to FIG. 8, such a cluster analysis would identify the x-intercept of diagonal line 804, i.e., the point at which the received energy is theoretically zero and the corresponding value of the source energy corresponds to the attenuation estimate.

Figure 9:
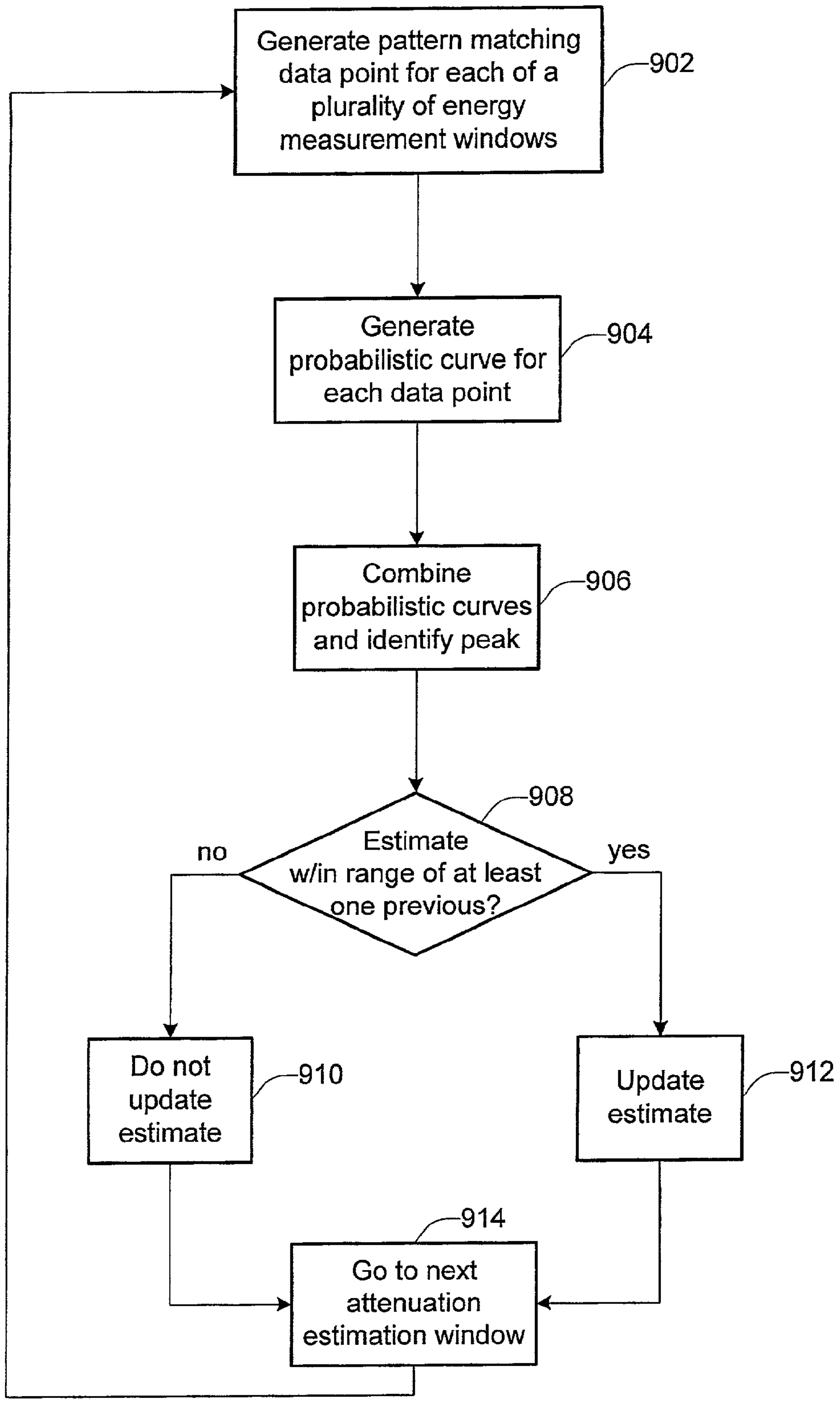
FIG. 9 is a flowchart illustrating a cluster analysis algorithm according to a specific embodiment of the present invention.

According to a specific embodiment, the cluster analysis referred to in 608 is performed using a standard median analysis on a histogram which uses as data points the difference between the source energy and the received energy, i.e., $\log E_{source} - \log E_{received}$, at each point in time. According to an alternate embodiment, the cluster analysis of 608 is performed on these same data points using a different approach. That is, according to this embodiment, instead of creating a histogram using these data points, each data point is represented as a probabilistic distribution, e.g., a bell curve, centered on the data point. This is a heuristic device which reflects the intrinsic uncertainty in these data. Referring now to the flowchart of FIG. 9, a specific implementation of this embodiment will be described.

The difference between the source and received energy measurements for each of a plurality of successive energy measurement windows is determined (902). According to various specific embodiments, the number of successive energy measurement windows for generating these data for each attenuation estimate (i.e., the attenuation estimate window) may vary and should be chosen to provide sufficient data for an accurate estimate. For example, according to one embodiment where the energy measurement windows are 10 ms, the attenuation estimate window is selected to be on the order of 4 seconds, thereby allowing in the neighborhood of 400 data points.

A probabilistic curve for each such data point is then generated (904). The curves are added together as with a histogram, resulting in a combined curve which has a very high peak at what is taken to be the best attenuation estimate (906). The process may be repeated for subsequent energy measurement windows. Alternatively, the successive energy measurement windows for each attenuation estimate may overlap. Whether the attenuation estimate windows are consecutive or overlapping, and according to a specific embodiment, each attenuation estimate may be compared to at least one previous attenuation estimate. According to one such embodiment, the attenuation is not updated to the new attenuation estimate unless some number of successive estimate, e.g., 3, fall within some range of each other, e.g., ±4 dB, (908–912). The process is then repeated for the next attenuation estimation window (914).

According to a more specific embodiment, and because certain data points will have more value than others, the heights of the probabilistic curves may be weighted according to the relationship of the corresponding measured energies to their respective noise floors. For example, there is no reason to consider data points where either the source energy or the received energy is below the noise floor. That is, these measured energy values are compared to the estimated noise floors determined in their respective energy detection algorithms, e.g., blocks 102 and 112 of FIG. 1, and, if either falls below the corresponding noise floor, the data point may either be discarded or assigned a curve with a height of zero.

More generally, and according to various embodiments of the invention, the height of the distribution curves may be determined with reference to one or more parameters which reflect the relative importance of the data. This would tend to de-emphasize the less important data. For example, and as discussed in the previous paragraph, the height of the bell curve associated with a particular data point may be assigned in accordance with the extent to which each of the energy measurements associated with the data point exceeds its respective noise floor. According to one such embodiment, the source energy is compared to its noise floor and the corresponding received energy is compared to its noise floor. The smaller of the two comparisons (or an average of the two) may then be used to select a height for the associated curve.

Figure 11:
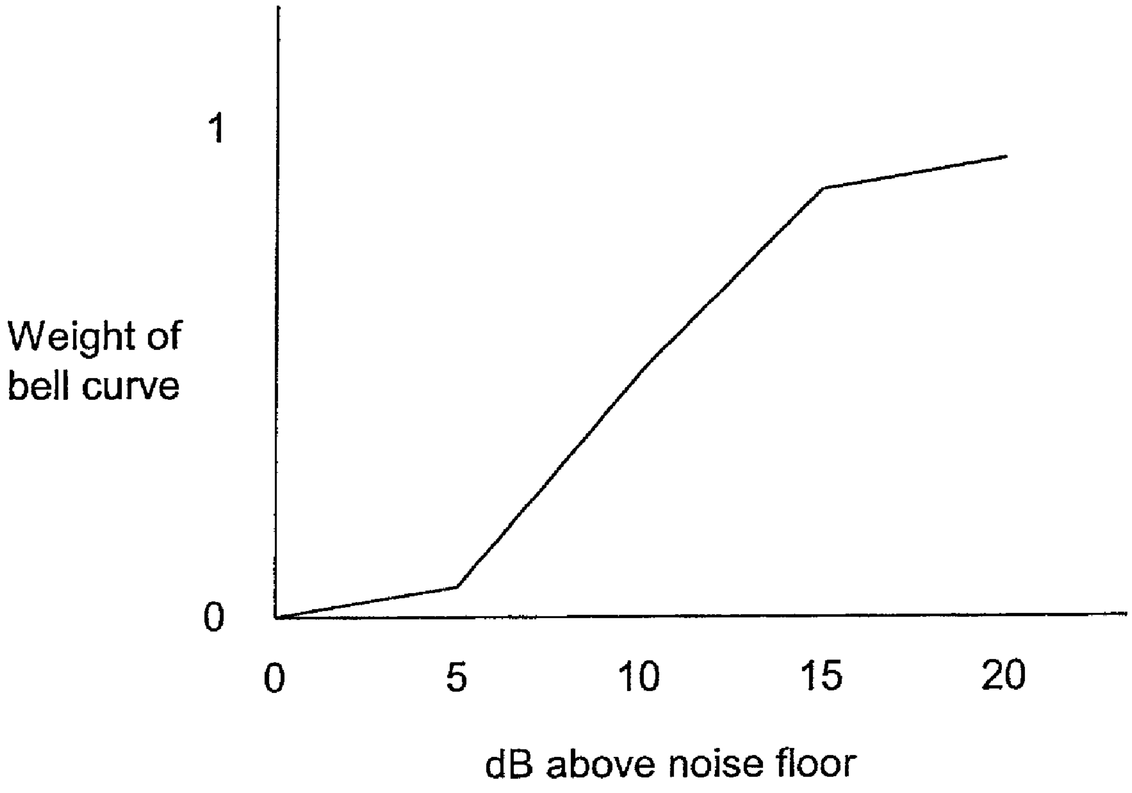
FIG. 11 is a graph of a function which may be employed to implement a specific embodiment of the invention.

According to various embodiments, the function by which the height of each curve is determined can be implemented with a mathematical function having generally an "S" shape (see FIG. 11), or by a table lookup method resulting in a function with such a shape. In one such embodiment, the input to this function is the number of dB by which the energy in one block of data exceeds the estimated noise floor. The output is a factor from 0 to 1 which gives the relative weighting assigned to the bell curve.

Another factor which may be used to assign a height to these curves relates to the shape of the received energy signal. That is, there are relatively flat regions of the energy bursts in speech signals which convey very little information which is useful in pattern matching algorithms. These flat regions may correspond, for example, to vowel energy or the effects of dynamic range compression (e.g., DRC block 108 of FIG. 1). That is, after dynamic range compression of a speech signal occurs some amount of signal information is lost or removed resulting in a "smoothing out" or "flattening" of a region of the energy curve which may then resemble any of multiple such flat regions in the source energy signal. This is obviously an issue when attempting to match the patterns in one signal to those in the other.

Therefore, according to a specific embodiment, in regions where the energy in either curve is relatively constant (as determined with reference to successive energy measurements), the data points are de-emphasized. That is, the heights of the probabilistic curves for the data points in this regions are multiplied by some factor less than one according to the flatness of the regions. According to various embodiments, the determination to apply such a factor may be binary, i.e., if a flatness threshold is reached, apply 0.5 to the height of the probabilistic curve. Alternatively, there may be multiple degrees of flatness each having an associated weighting factor.

In general, a specific embodiment of the invention provides a pattern matching algorithm in which information about the measured energy for the source and received signals may be employed to emphasize the pattern matching data for the regions of the energy curves in which significant and detectable events are occurring and to de-emphasize the data for the regions in which little or no significant information is available.

For the transmission path associated with the far-end equipment, e.g., FIG. 5*b*, the delay is unknown so both the attenuation and delay must be estimated. According to a specific embodiment of the invention, the attenuation and delay associated with the far-end transmission path in a telephony system (e.g., system 100 of FIG. 1) is estimated according to the exemplary process illustrated in the flowchart of FIG. 10. It should be noted that the process illustrated in and described with reference to FIG. 10 may be used, for example, to implement far-end attenuation and delay block 128 of FIG. 1. It should also be noted that this exemplary process is similar to the near-end attenuation estimation process described above with reference to FIG. 6 except that it is run for a plurality of possible delay values rather than a single known delay. Therefore, the refinements, alternatives, and variations described above with reference to that process are similarly applicable here.

The energy of the far-end transmission path source and received signals are measured for successive windows of samples, i.e., the attenuation estimation window (1002). In telephony system 100 of FIG. 1, this would be done by energy detection blocks 102 and 112, respectively, as described above. Because the delay for the transmission path is unknown, a delay value is selected from a range of values for this pass through the attenuation estimation algorithm (1004). Using the current delay value for the far-end transmission path, the offset between the energy signals corresponding to the source and the receiver is adjusted (1006). For example, referring to FIG. 1, the current delay value can be subtracted from the samples output from energy detection block 112 in FIFO 134 to effectively move the samples back in time with respect to the corresponding samples from energy detection block 102.

The energy samples from both the source signal and the received signal are then analyzed to generate pattern matching data (1008). As with the embodiment of FIG. 6, these data may be represented by a scatter graph similar to the one described above with reference to FIG. 8. A cluster analysis is then performed on the results of 1008 to estimate the attenuation in the transmission path for the current delay value (1010).

As described above with reference to FIG. 6, the cluster analysis may be performed using a standard median analysis on a histogram which uses as data points the difference between the source energy and the received energy, i.e., log $E_{source}$−log $E_{received}$, at each point in time. Alternatively, the cluster analysis may be performed on these same data points using the approach illustrated by and described with reference to FIG. 9 and any of the refinements, alternatives, and variations thereof.

In any case, once an attenuation estimate for the current delay value has been determined, the delay value is updated to the next value in the range and the attenuation estimation repeated until all of the delay values in the range are used (1012 and 1014). Thus, an attenuation estimate is generated for each of the delay values in the range. The highest of the histogram peaks generated in all of the cluster analyses for the current attenuation estimation window is designated as the attenuation estimate (1016) and the associated delay value as the delay estimate (1018). The entire process is then repeated for the next attenuation estimation window.

As described above, the number of successive energy measurement windows for generating the data for each attenuation estimate (i.e., the attenuation estimate window) may vary and should be chosen to provide sufficient data for an accurate estimate. In addition, the successive energy measurement windows for each attenuation estimate may be consecutive or overlap. Whether the attenuation estimate windows are consecutive or overlapping, and according to a specific embodiment, each pair of attenuation and delay estimates may be compared to the previous estimates. According to one such embodiment, the estimates are not updated to the new estimates unless some number of successive estimates, e.g., 3, fall within some range of each other, e.g., ±4 dB for the attenuation estimate and ±40 ms for the delay estimate.

According to a specific embodiment, the range of delay values is from 0 to 1.6 seconds in increments of 40 ms. According to a further embodiment, once the delay estimate is selected from among the values in this range (e.g., 1018), the process of FIG. 10 could be repeated for smaller increments of delay values, e.g., 5 or 10 ms increments, to refine the attenuation and delay estimates for the current estimation window.

Figure 10:
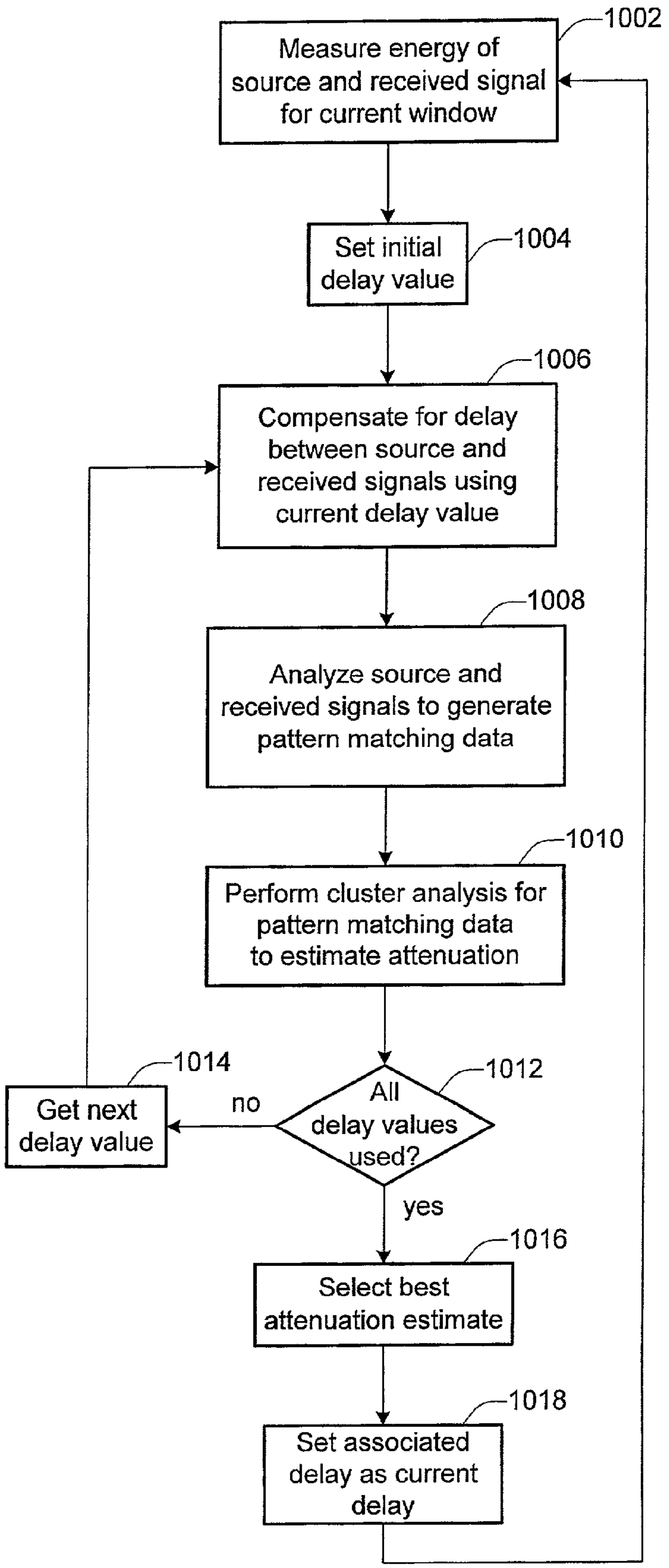
FIG. 10 is a flowchart illustrating a far-end transmission path attenuation and delay estimation algorithm according to a specific embodiment of the invention.

As with the speech detection algorithm described above with reference to FIG. 3, the attenuation and delay estimation algorithms of FIGS. 6 and 10 may have broadband or multi-band implementations. That is, the energy of the source and received signals may be divided into a plurality of frequency bands using, for example, Fast Fourier Transforms (FFTs) or band-splitting filters. The estimation algorithms described above with reference to FIGS. 6 and 10 would be applied in parallel to each frequency band. Such an approach could be advantageous in that different frequency speech components may have different levels of energy which are significant. So, for example, based on the critical band theory of speech, attenuation estimates for the different bands may be weighted differently, i.e., have greater or lesser levels of confidence associated therewith, depending upon the band with which the estimate is associated.

According to specific embodiments, the relative widths of the bands in such multi-band embodiments can be made to correlate with these critical bands so that the bands are treated in accordance with their perceptual relevance. Thus, for example, the bands at the lower end of the spectrum could be narrower with the width increasing toward the higher frequency bands. This is reflective of the fact that there is a relatively narrow band, i.e., between 100 Hz and 800 Hz, where more most of the information relating to the intelligibility of vowels and consonants lies. Thus, having a relatively larger number of narrower bands in this region could improve the accuracy of the attenuation estimates.

According to various embodiments, the number and widths of the bands in the multi-band embodiments of the attenuation and delay estimation algorithms of the present invention may or may not correlate to the number and widths of the bands in speech detection algorithms which employ their results. According to one set of embodiments, the number and widths of the bands for the speech detection algorithms are the same as for the attenuation and delay estimation algorithms. According to one such embodiment, the individual estimates for attenuation and delay for each band are used in the speech detection algorithm for the same band.

According to a specific embodiment implemented in telephony system 100 of FIG. 1 and as described above, the delay estimate generated by far-end attenuation and delay block 128 is used to control the delay applied to the output of near-end speech detection block 118 in FIFO buffer 126. As mentioned above, the purpose of introducing this delay is to ensure that ducking does not occur until after the near-end speech has had a chance to make the round trip from the near-end microphone to the far-end equipment and back, the duration of which is accurately estimated by block 128.

According to a specific embodiment, the known near-end path delay and the far-end path delay estimate from block 128 are used as inputs to near-end speech detection block 118 and far-end speech detection block 120, respectively. The known near-end path delay is applied to the output of energy detection block 112 in FIFO buffer 134 which provides this delayed signal to near-end speech detection algorithm 118. More specifically, the delayed energy signal is combined with the near-end attenuation estimate from block 130 via adder 140 the output of which is then applied to block 118. The purpose of this input is to prevent the situation where energy attributable to far-end speech is detected as near-end speech. That is, if the energy detected by energy detection block 102 is determined to correspond to far-end energy (e.g., coupled from the near-end speaker to the near-end microphone via the near-end path) then near-end speech is not declared. Whether or not the detected energy corresponds to near or far-end speech is determined with reference to the known near-end attenuation, i.e., the energy is not likely to correspond to near-end speech if it is below a certain level.

For a similar reason, the delay estimate from block 128 is applied to the output of energy detection block 102 in FIFO buffer 132 and the resulting delay signal is combined with the far-end attenuation estimate from block 128 via adder 142, the output of which is then applied to far-end speech detection block 120. This input is used to ensure that far-end speech is not declared as a result of energy attributable to near-end speech. That is, near-end speech coupled from the far-end speaker to the far-end microphone may be detected at energy detection block 112. If the detected energy is determined to correspond to near-end speech, declaration of far-end speech is inhibited. As discussed above, whether or not the detected energy corresponds to near or near-end speech is determined with reference to the known far-end attenuation, i.e., the energy is not likely to correspond to far-end speech if it is below a certain level.

While the invention has been particularly shown and described with reference to specific embodiments thereof, it will be understood by those skilled in the art that changes in the form and details of the disclosed embodiments may be made without departing from the spirit or scope of the invention. For example, specific embodiments of the present invention have been described with reference to a telephony system which resembles a so-called voiceover-IP telephony system in which speech signals are transmitted over a wide area network in data packets according to the well known TCP/IP or UDP/IP protocols. It should be understood, however, that the speech detection and echo suppression techniques of the present invention may be implemented in a wide variety of telephony systems having other network types and using other communication protocols. For example, embodiments of the present invention may be implemented in telephony systems in any type of telecommunications infrastructure, e.g., POTS or a wireless network.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. At least one computer readable medium having computer program instructions stored therein for detecting speech in a telephony system, the computer program instructions comprising:

first instructions for measuring an energy level associated with a received signal;

second instructions for comparing the energy level with a current noise estimate;

third instructions for updating the current noise estimate to be equal to the energy level where the energy level is less than the current noise estimate;

fourth instructions for increasing the current noise estimate using an upward bias where the energy level is greater than the current noise estimate;

fifth instructions for setting a hysteresis value with reference to whether speech is determined to be occurring, comprising setting the hysteresis value to a nonzero constant if speech is currently determined to be occurring and setting the hysteresis value to zero if speech is currently determined not to be occurring; and sixth instructions for detecting speech energy with reference to a threshold and the hysteresis value, the threshold being determined with reference to the current noise estimate.

2. The at least one computer readable medium of claim 1 wherein the first instructions are operable to detect burst of speech energy having a leading edge and a trailing edge; and wherein the sixth instructions are operable to identify a period of time during which speech is determined to be occurring, the period of time beginning a first predetermined amount of time before the leading edge of the burst of speech energy and ending a second predetermined amount of time after the trailing edge of the burst of speech energy.

3. The at least one computer readable medium of claim 1 wherein the first through fifth instructions are performed for each of a plurality of frequency bands, and wherein the sixth instructions are operable to determine speech to be occurring where the energy level exceeds the threshold level for at least one of the plurality of frequency bands.

4. At least one computer readable medium having computer program instructions stored therein for detecting speech in a telephony system, the computer program instructions comprising:

first instructions for setting a hysteresis value with reference to whether speech is determined to be occurring, comprising setting the hysteresis value to a nonzero constant if speech is currently determined to be occurring and setting the hysteresis value to zero if speech is currently determined not to be occurring; and second instructions for detecting speech with reference to a threshold value and the hysteresis value, the threshold value being determined with reference to a current noise estimate.

* * * * *